(12) United States Patent
Höck

(10) Patent No.: US 6,241,067 B1
(45) Date of Patent: Jun. 5, 2001

(54) MECHANICAL CLUTCH

(75) Inventor: Michael Höck, Neunkirchen-Seelscheid (DE)

(73) Assignee: GKN ViscoDrive GmbH, Lohmar (DE)

(*) Notice: Subject to any disclaimer, the term of this patent is extended or adjusted under 35 U.S.C. 154(b) by 0 days.

(21) Appl. No.: 09/416,653

(22) Filed: Oct. 12, 1999

(30) Foreign Application Priority Data

Oct. 14, 1998 (DE) ............................................. 198 47 405

(51) Int. Cl.[7] ..................................................... F16D 37/02
(52) U.S. Cl. ................. 192/85 A; 192/30 W; 192/56.32; 192/56.42; 192/69.8; 192/114 R
(58) Field of Search ............................. 192/56.32, 56.42, 192/84.92, 66.22, 69.8, 114 R, 30 W, 90, 85 A

(56) References Cited

U.S. PATENT DOCUMENTS

| | | | |
|---|---|---|---|
| 3,380,264 | * | 4/1968 | Moore ............................ 192/56.32 X |
| 3,807,539 | * | 4/1974 | Reed .............................. 192/56.32 X |
| 3,917,042 | * | 11/1975 | Summa ............................... 192/84.92 |
| 4,257,147 | * | 3/1981 | Moss ............................. 192/56.42 X |
| 5,094,328 | * | 3/1992 | Palmer ................................. 192/21.5 |
| 5,915,513 | * | 6/1999 | Isley et al. ............................... 192/35 |
| 6,009,989 | * | 1/2000 | Boffelli et al. ........................... 192/90 |

FOREIGN PATENT DOCUMENTS

| | | |
|---|---|---|
| 1 061 578 | 7/1959 | (DE). |
| 195 24 104 A1 | 2/1996 | (DE). |
| 197 37 766 A1 | 3/1998 | (DE). |
| 197 17 705 A1 | 10/1998 | (DE). |
| 0 882 904 A1 | 12/1998 | (EP). |
| 2 125 230 | 4/1984 | (GB). |
| 2 218 758 | * 11/1989 | (GB). |

* cited by examiner

Primary Examiner—Rodney H. Bonck
(74) Attorney, Agent, or Firm—Francis Carten

(57) ABSTRACT

A mechanical clutch with two elements (11, 21) which, for the purpose of positively engaging one another, are provided with opposed end toothings which are adapted to one another, the first element (11) being rotatably mounted and axially supported, the second element (21) also being rotatably mounted and axially supported, and further being axially blocked in a first position for the purpose of being non-rotatably engaged with the first element (11), and being axially moveable into a position in which it is freely rotatably and disengaged from the first element (11), with a device for selectively axially blocking the second element (21), the clutch further comprising: a cavity system whose shape is variable and which is filled with a magneto-rheological fluid; a displacing member which can be moved between a first position and a second position, which delimits the cavity system and which is connected to the second element (21); and an electro-magnet (37) which can magnetize at least part of the magneto-rheological fluid for shape-setting purposes.

19 Claims, 3 Drawing Sheets

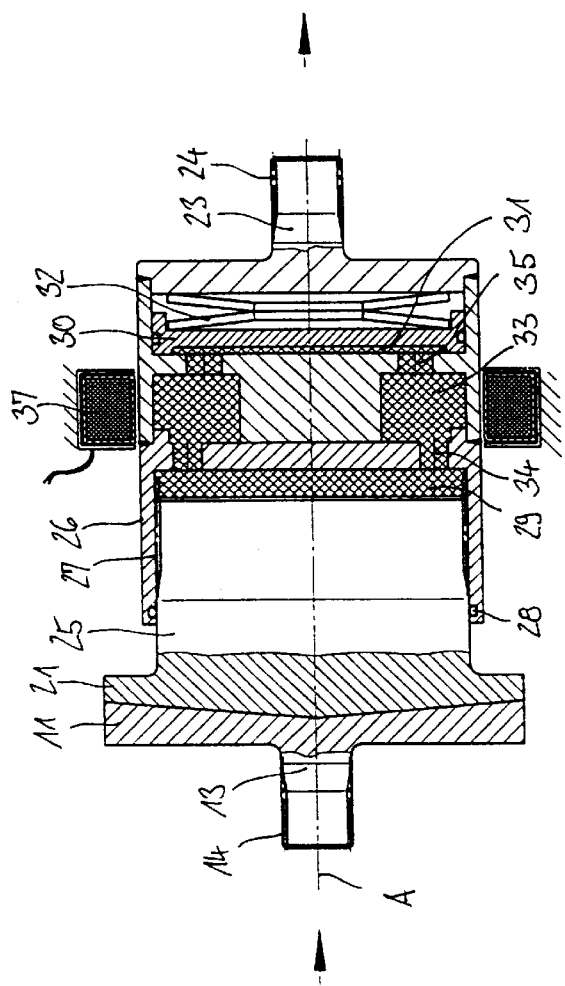

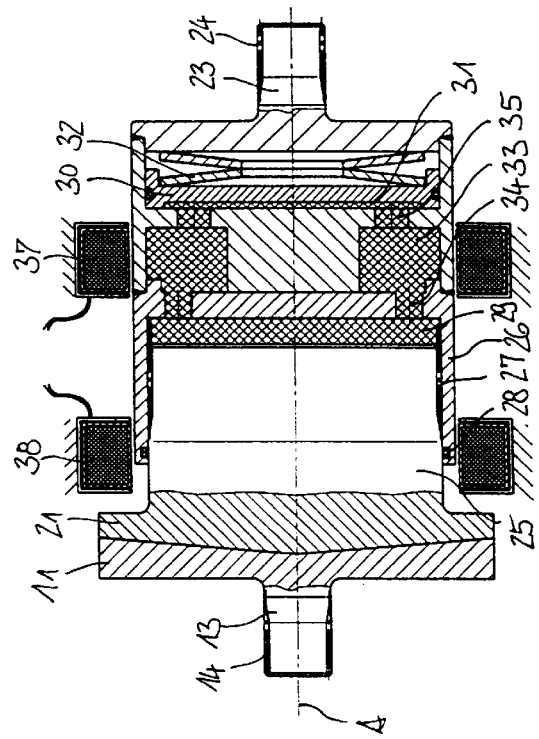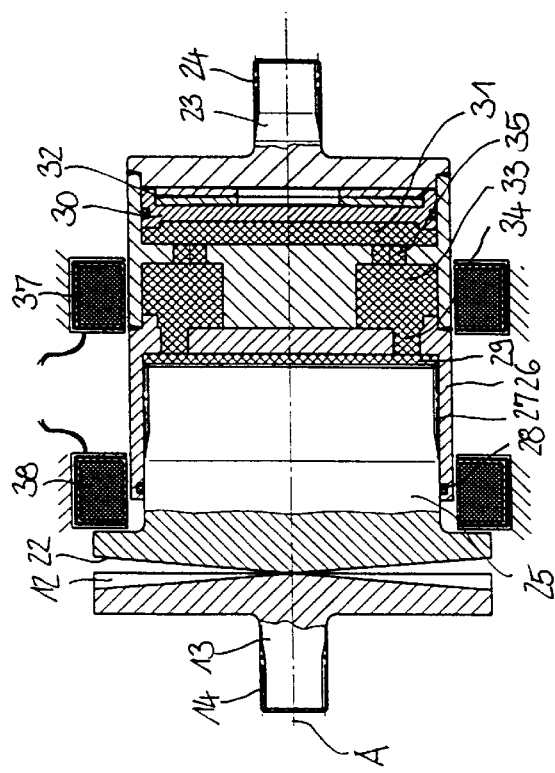

MECHANICAL CLUTCH

BACKGROUND OF THE INVENTION

The invention relates to a clutch with two elements which, for the purpose of positively engaging one another, are provided with opposed end toothings adapted to one another, the first element being rotatably mounted and axially supported, and the second element also being rotatably mounted and axially supported, with a blocking device for selectively blocking the axial movement of the second element. The second element can be axially blocked in a first position for the purpose of being non-rotatably engaged with the first element, and can be axially moved into a second position for the purpose of being separated from the first element and freely rotatable, depending upon the blocking device being actuated or non-actuated.

It is the object of the present invention to provide such a clutch having a simple design and particularly suitable for use in the driveline of a multi-axis motor vehicle which can optionally be operated by one driven axle or two driven axles, the clutch serving to connect or disconnect the second axle.

SUMMARY OF THE INVENTION

The present invention is embodied in and carried out by a clutch of the aforesaid type, wherein the blocking device comprises the following parts:

- a cavity system of changing cross-section and variable volume, and filled with a magneto-rheological fluid;
- a displacing member which can be moved between a first position and a second position, which delimits the cavity system and which is connected to the second element; and
- an electro-magnet which can magnetize at least part of the magneto-rheological fluid for shape-setting purposes.

There are many possibilities for the practical application of the applicant's clutch, the operating principle being that a displacing element in the cavity system is used as an axial locking element in that the magneto-rheological fluid delimited by the displacing member in the cavity system is magnetized and thus given a fixed shape, i.e., rigidified. A displacement of the magneto-rheological fluid by the displacing member into parts of the cavity system which have a changing cross-section is thus prevented, so that the displacing member is prevented from moving axially. In an advantageous embodiment, magnetization of the electro-magnetic fluid can be reduced to a small volume percentage which is contained in cavity regions whose cross-sections and shapes differ considerably.

In a simply-designed embodiment, the cavity system can have two cylinder chambers which are connected to one another (blocking chamber-compensating chamber) which each accommodate corresponding pistons operating in opposite directions (blocking piston—compensating piston), with the two cylinder chambers being connected to one another by connecting channels operating as valves. Now, if the electro-rheological fluid in the valve and in regions directly adjoining the valve on both sides and having a deviating cross-section is solidified by energizing the electro-magnet, this process corresponds to locking a valve in a corresponding connection, as a result of which overflowing of the liquid from the blocking chamber into the compensating chamber and vice versa is prevented, with the pistons being fixed in their respective positions. Advantageous features of this system are that it is wear-free and cheap to produce.

Furthermore, it is proposed that pre-tensioned spring means move the second element at least indirectly into the engaged first position of the clutch when the blocking device is set to be non-effective. This is advantageous if the disengaged second position is assumed only rarely. In this context, it is possible for the compensating piston to be loaded backwardly by the pre-tensioned spring means, especially by plate springs. The second element is then moved directly by the blocking piston via the displaced fluid.

In addition, it is proposed that controllable disengaging means move the second element into the disengaged second position of the clutch when the blocking device is set to be non-effective, the advantage being that, with the blocking device being set to be ineffective, the elements are precisely separated from one another. Furthermore, it has to be ensured that, before the blocking device is actuated, the temporarily-controlled disengaging means move the second element into the disengaged second position of the clutch. The precisely separated elements can thus be locked against the force of the spring means; the disengaging means, preferably an electro-magnet, can be switched off again. According to an embodiment which is advantageous in design and functioning, the end toothings have inclined flanks which, when the blocking device is set to be non-effective, push the second element away from the first element into the disengaged second position by application of torque.

DESCRIPTION OF THE DRAWINGS

The written description of the present invention will be more fully understood when read with reference to the accompanying drawings, of which:

FIG. 1 shows a first clutch embodiment in the engaged condition.

FIG. 2 shows the clutch embodiment according to FIG. 1 in the disengaged condition.

FIG. 5 shows a third clutch embodiment with disengaging means, in the engaged condition.

FIG. 6 shows the clutch embodiment according to FIG. 5 in the disengaged condition.

DETAILED DESCRIPTION OF THE INVENTION

Figure 3:
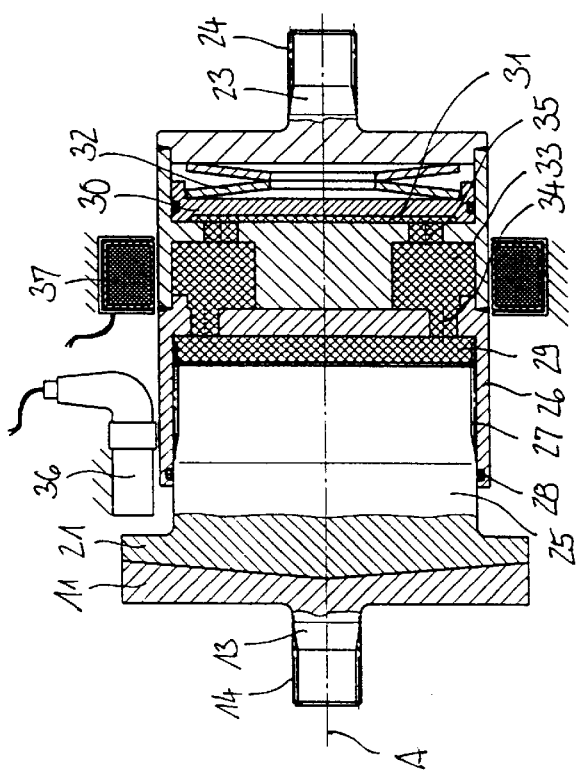
FIG. 3 shows a second clutch embodiment incorporating sensor means, in the engaged condition.

The various Figures will first be described jointly. They each show a first element 11 in an embodiment which is substantially rotationally symmetric relative to an axis of rotation A, which is rotatable around the axis A and which is axially supported by means not shown in detail. Element 11 comprises a set of end toothing 12 and an axle journal 13, the latter being provided with a shaft toothing 14 for connection to a source of torque. There is also shown a second element 21 which is also rotationally symmetric relative to the axis of rotation A, which is rotatable around the axis A and which is provided with a set of end toothing 22 adapted to the end toothing 12 of element 11. The element 21 consists of several parts and comprises a shaft journal 23 which is also axially supported by means not described in greater detail and comprises a set of shaft toothing 24 from which torque can be taken. The second element 21 is connected to a cylindrical piston 25 and the shaft journal 23 is connected to a cylindrical housing 26. The piston 25 is axially displaceable in the housing 26, with the transmission of torque being ensured by a tooth engagement 27. The piston 25 is sealed in the housing 26 by a seal 28. The piston 25 and the housing 26 form a cylinder chamber 29 whose volume is variable. Furthermore, in the housing 26 there is provided a compensating chamber 31 which is formed by a compensating piston 30 and whose volume is also variable. The compensating piston 30 is backwardly resiliently supported by plate springs 32. The cylinder chamber 29 and the compensating chamber 31 are connected to one another by an annular chamber 33, and by intermediate connecting bores 34, 35 which have small cross-sections and which are radially offset relative to one another. The cavity system formed in this way is filled with an electro-rheological fluid. An annular electro-magnet 37 surrounds the annular chamber 33. When the electro-magnet is energized, the magneto-rheological fluid at least in the annular chamber 33 is rigidified, so that fluid cannot flow through the annular chamber; this would only be possible if the fluid changed its shape, i.e., became de-rigidified or fluid.

In FIGS. 1, 3, and 5, the clutch is engaged, i.e. the end toothings 12, 22 of the elements 11, 21 positively engage one another. Under the influence of the pair of plate springs 32, the compensating chamber 31 is reduced to its minimum volume and the cylinder chamber 29 is increased to its maximum volume. In this position, the piston 25 is blocked from any axial movement as a result of the electro-magnet 37 being energized. Torque can now be transmitted from the journal 13 to the journal 23 in a play-free manner.

Figure 4:
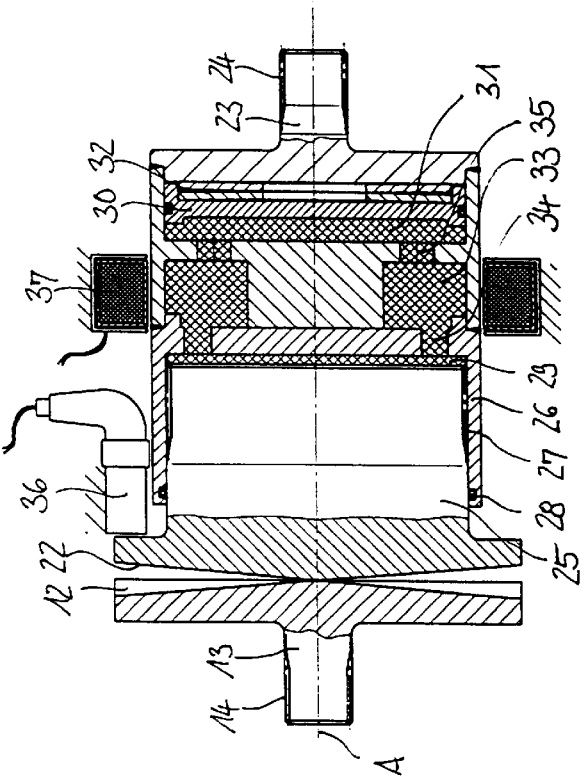
FIG. 4 shows the clutch embodiment according to FIG. 3 in the disengaged condition.

FIGS. 2, 4 and 6 show how the end toothings 12, 22 of the elements 11, 21 are disengaged in that they have axially moved away from one another. In the embodiment according to FIGS. 1 and 2, this can only be achieved by pressing the end toothings 12, 22 axially apart by the application of torque. The same applies to the embodiment according to FIGS. 3 and 4, which is provided with a sensor 36 which generates a control signal when the elements are fully disengaged, which control signal is used to switch on the electro-magnet 37 again. As a result, the piston 25 is again blocked in position by the electro-rheological fluid, so that the end toothings 12, 22 of the elements 11, 21 are not subjected to the load of the plate springs 32 in order to avoid wear. In the embodiment according to FIGS. 3 and 4, the end toothings 12, 22 are primarily disengaged by temporarily energizing an electro-magnet 38 which axially acts on the element 21. In addition to the end toothings 12, 22 being moved apart, it is possible to set a precise distance between the elements 11, 21 in order to avoid wear and friction losses.

Disengagement of the elements 11, 21 presupposes that the electro-magnet 37 is de-energized and that the fluid can flow through the annular chamber 33 by changing the fluidity of electro-rheological fluid. The volume of the cylinder chamber 29 is minimized and the volume of the compensating chamber 31 is increased. The compensating piston abuts in the housing 26. The two journals 13, 23 and the two elements 11, 21 are freely rotatable relative to one another.

Certain modifications and variations of the disclosed embodiments of the present invention will be apparent to those skilled in the art. It should be understood that the disclosed embodiments are intended to be illustrative only, and not in any way restrictive of the scope of the invention as defined by the claims set forth hereunder.

I claim:

1. A mechanical clutch comprising:
   (a) two elements (11, 21) which, for the purpose of positively engaging one another, comprise opposed end toothings (12, 22) which are adapted to engage one another, said first element (11) and said second element (21) being rotatably mounted and axially supported, said second element (21) being either axially blocked in a first position for the purpose of being positively non-rotatably engaged with said first element (11), or being axially moved into a second position for the purpose of being freely rotatably and disengaged from said first element (11); and
   (b) blocking means for selectively preventing axial movement of said second element (21), comprising a cavity system whose shape is variable and which is filled with a magneto-rheological fluid; a displacing member which can be moved between a first position and a second position, which delimits said cavity system and which is connected to said second element (21); and an electro-magnet (37) which is operative, when energized, to magnetize at least part of said magneto-rheological fluid and thus make it rigid.

2. A mechanical clutch according to claim 1, wherein said cavity system with a variable shape comprises a cylinder chamber (29) in which a blocking piston (25) is displaceably guided, connecting channels (33, 34, 35) and a compensating chamber (31) in which a compensating piston (30) is displaceably supported; each of said connecting channels (33, 34, 35) has a stepped cross-section; and said electro-magnet (37) is operative, when energized, to magnetize the magneto-rheological fluid inside the connecting channels (33, 34, 35).

3. A mechanical clutch according to any one of claims 1 or 2, wherein pre-tensioned spring means (32) moves said second element (21) at least indirectly into said engaged first position of the clutch when said blocking device is set to be non-effective.

4. A mechanical clutch according to claim 3, wherein said compensating piston is loaded backwardly by said pre-tensioned spring means (32).

5. A mechanical clutch according to claim 3, wherein said pre-tensioned spring means (32) is formed by a pair of opposed plate springs.

6. A mechanical clutch according to any one of claims 1 or 2, wherein said end toothings (12, 22) have inclined flanks which, by the application of torque, push said second element (21) away from said first element (11) into the disengaged second position when said blocking device is set to be non-effective.

7. A mechanical clutch according to any one of claims 1 or 2, further comprising sensor means (36) operative to detect said disengaged second position when it has been reached and thereafter to set said blocking device for the purpose of blocking said second element (21) in said second disengaged position.

8. A mechanical clutch according to any one of claims 1 or 2, further comprising disengaging means (38) operative to move said second element (21) into the disengaged second position when said blocking device is set to be non-effective.

9. A mechanical clutch according to claim 8, wherein said blocking device is set to be effective for the purpose of blocking said second element (21) in the disengaged second position after said disengaging means (38) has been set to be effective and the disengaged second position has been reached.

10. A mechanical clutch comprising:
    (a) two elements (11, 21) which, for the purpose of positively engaging one another, comprise opposed end toothings (12, 22) which are adapted to engage one another, said first element (11) and said second element

(21) being rotatably mounted and axially supported, said second element (21) being either axially blocked in a first position for the purpose of being positively non-rotatably engaged with said first element (11), or being axially moved into a second position for the purpose of being freely rotatably and disengaged from said first element (11);

(b) blocking means for selectively preventing axial movement of said second element (21), comprising a cavity system whose shape is variable and which is filled with a magneto-rheological fluid; a displacing member which can be moved between a first position and a second position, which delimits said cavity system and which is connected to said second element (21); and an electro-magnet (37) which is operative, when energized, to magnetize at least part of said magneto-rheological fluid and thus make it rigid; and (c) sensor means (36) operative to detect said disengaged second position when it has been reached and thereafter to set said blocking device for the purpose of blocking said second element (21) in said second disengaged position.

11. A mechanical clutch according to claim 10, wherein said cavity system with a variable shape comprises a cylinder chamber (29) in which a blocking piston (25) is displaceably guided, connecting channels (33, 34, 35) and a compensating chamber (31) in which a compensating piston (30) is displaceably supported; each of said connecting channels (33, 34, 35) has a stepped cross-section; and said electromagnet (37) is operative, when energized, to magnetize the magneto-rheological fluid inside the connecting channels (33, 34, 35).

12. A mechanical clutch according to any one of claims 10 or 11, wherein pre-tensioned spring means (32) moves said second element (21) at least indirectly into said engaged first position of the clutch when said blocking device is set to be non-effective.

13. A mechanical clutch according to claim 12, wherein said compensating piston is loaded backwardly by said pre-tensioned spring means (32).

14. A mechanical clutch according to claim 12, wherein said pre-tensioned spring means (32) is formed by a pair of opposed plate springs.

15. A mechanical clutch according to claim 12, wherein said compensating piston is loaded backwardly by said pre-tensioned spring means (32).

16. A mechanical clutch comprising:

(a) two elements (11, 21) which, for the purpose of positively engaging one another, comprise opposed end toothings (12, 22) which are adapted to engage one another, said first element (11) and said second element (21) being rotatably mounted and axially supported, said second element (21) being either axially blocked in a first position for the purpose of being positively non-rotatably engaged with said first element (11), or being axially moved into a second position for the purpose of being freely rotatably and disengaged from said first element (11);

(b) blocking means for selectively preventing axial movement of said second element (21), comprising a cavity system whose shape is variable and which is filled with a magneto-rheological fluid; a displacing member which can be moved between a first position and a second position, which delimits said cavity system and which is connected to said second element (21); and an electro-magnet (37) which is operative, when energized, to magnetize at least part of said magneto-rheological fluid and thus make it rigid; and (c) disengaging means (38) operative to move said second element (21) into the disengaged second position when said blocking device is set to be non-effective.

17. A mechanical clutch according to claim 16, wherein said cavity system with a variable shape comprises a cylinder chamber (29) in which a blocking piston (25) is displaceably guided, connecting channels (33, 34, 35) and a compensating chamber (31) in which a compensating piston (30) is displaceably supported; each of said connecting channels (33, 34, 35) has a stepped cross-section; and said electromagnet (37) is operative, when energized, to magnetize the magneto-rheological fluid inside the connecting channels (33, 34, 35).

18. A mechanical clutch according to any one of claims 16 or 17, wherein pre-tensioned spring means (32) moves said second element (21) at least indirectly into said engaged first position of the clutch when said blocking device is set to be non-effective.

19. A mechanical clutch according to claim 18, wherein said pre-tensioned spring means (32) is formed by a pair of opposed plate springs.

* * * * *